United States Patent [19]

Sullivan

[11] Patent Number: 4,810,091

[45] Date of Patent: Mar. 7, 1989

[54] APPARATUS AND METHOD FOR ADJUSTING FOCUS OF A MULTI-ELEMENT OPTICAL DETECTOR

[75] Inventor: James J. Sullivan, Newark, Del.

[73] Assignee: Hewlett-Packard Company, Palo Alto, Calif.

[21] Appl. No.: 139,509

[22] Filed: Dec. 30, 1987

[51] Int. Cl.$^4$ .............................. G01J 3/02; G01J 3/36
[52] U.S. Cl. ..................................... 356/326; 250/201; 356/331
[58] Field of Search ............... 356/319, 326, 328, 331, 356/334; 250/201, 201 AF, 201 DF, 201 PF

[56] References Cited

U.S. PATENT DOCUMENTS

| | | | |
|---|---|---|---|
| 3,830,571 | 8/1974 | Imai et al. | 356/123 |
| 3,856,407 | 12/1974 | Takeda et al. | 356/123 |
| 3,938,894 | 2/1976 | Nanba | 356/125 |
| 3,973,849 | 8/1976 | Jackson et al. | 356/308 |
| 4,047,187 | 9/1977 | Mashimo et al. | 354/23 |
| 4,435,079 | 3/1984 | Hennick | 356/123 |

Primary Examiner—Vincent P. McGraw
Attorney, Agent, or Firm—Frank R. Perillo; Richard F. Schuette

[57] ABSTRACT

A multi-element optical detector having a planar array of detector elements is focused at the focal plane of an optical spectrometer by placing the detector with the detecting surface of the array facing the optical spectrometer and being substantially perpendicular to the axis of the path of the light from the optical spectra to the focal plane. Relative movement is provided between the detector and the focal plane along said axis so that the detector array is placed at several different positions with respect to the focal plane. At each position the output values of the detector elements of the array are measured and the second difference of the output values is determined by the equation $(-F1 + 2 \times F2 - F3)$, where F1, F2, and F3 are the output values of three of the elements. The optical detector is placed at the position which provides the maximum value of the second difference, which is the position of the focal plane.

14 Claims, 2 Drawing Sheets

APPARATUS AND METHOD FOR ADJUSTING FOCUS OF A MULTI-ELEMENT OPTICAL DETECTOR

FIELD OF THE INVENTION

The present invention relates to an apparatus and method for adjusting the focus of multi-element optical detector. More particularly, the present invention relates to an apparatus and method for measuring the quality of the focus using the shape of the spectral image on the multi-element optical detector and adjusting the focus to the optimum quality.

BACKGROUND OF THE INVENTION

There are a number of devices, such as an optical spectrometer, which utilize a multi-element optical detector, such as an array of photodetectors, to detect and/or measure the features of an optical spectra. An important factor in their suitability for this purpose is the degree of focus achieved, in the plane where the features of the spectra are detected and measured. Thus, it is important in the manufacture and routine adjustment of these optical devices that the focus be optimized.

Optical devices, such as an optical spectrometer, have been generally focused by placing a series of photographic plates in the focal plane, and exposing each at a different focus setting. When the plates are developed, the best focus setting is chosen, based on the sharpness of the spectral lines. The assessment of sharpness is usually a matter of visual interpretation, combining subjective impressions of the narrowness and intensity of the spectral lines.

For optical devices, such as scanning spectrometers, where a spectrum is produced in the form of a stripchart or in the form of a computer record of many different readings, a similar method can be used. A section of spectrum is examined after each change of the focus setting until an optimum is found. However, for this type of device a more objective measure of focus than visual interpretation can be used. The following method can be carried out either manually or automatically to measure the quality of focus:

1. The plot of the spectrum is examined to find a chosen peak. If there is more than one spectral peak, there needs to be a secondary rule for choosing a certain one. Such a rule might be to take the peak with the largest maximum intensity, or the peak closest to a certain wavelength. When focus is far from optimum, combinations of several peaks may be mis-interpreted as the most intense peak. If the wavelength scale is not precisely known, there may be difficulties in choosing the peak of interest.

2. Once a peak is chosen, it is necessary to examine the regions adjacent to the peak, and to choose two baseline points.

3. Now the sharpness can be measured, either as the height of the peak above baseline, or as the peakwidth of the peak, at one-half of the peak height above baseline for example. The first measure suffers if the peak intensity is varying. The second measure suffers, if the baseline points are affected by smaller peaks lying near the chosen peak. Both measurement techniques suffer if the wrong peak is chosen, or if the peak used for the measurement changes during the test. Both measurement techniques suffer if the measurement peak is not much larger than neighboring peaks in the spectrum.

Multi-element optical detector arrays can measure many points in a spectrum at the same time. Therefore, it is possible to use the resulting series of measurements to perform the above method. However, there are problems. In some cases, the size of the individual element of the detector array is nearly as big, or bigger, than a spectral line. In such a case, the relative location of the spectral line with the pattern of detector element causes a change in the measure of focus. This undesired change is known as the relative registration problem. If the measurement of focus is automated, other problems may occur. For example, it becomes difficult to separate out the effects of intensity changes and of other changes in the spectrum, from changes in focus.

Designers of photographic cameras have developed several ways to auto-focus the lens of the camera. Many of these auto-focusing techniques have common features in that they use a plurality of detectors and there is a separation of the incident light into two or more paths through the optics. The pattern of the multiple light beams on the detector array is then sensed. However, for many types of devices, such as spectrometers, these techniques cannot be easily applied For these devices it is preferred to use measurements of spectral structure of the light to measure focus, rather than multiple optical paths and it is important that the light path not be altered for proper operation of the device.

SUMMARY OF THE INVENTION

In a device having a multi-element optical detector for measuring and/or detecting the features of an optical spectrum the detector is focused with respect to the optical spectrum by placing the detector along the axis of the light from the optical spectrometer with the detector elements being in a plane generally parallel to the focal plane. Measurements are made at three points along the array of detectors and the second difference of the measurements is determined by the equation $(-F1+2\times F2-F3)$ where $F1$, $F2$ and $F3$ are the three measurements. The array of detector elements is moved along the axis and the second difference is determined at several points along the axis. The point where the second difference is the greatest is the position of optimum focus.

DETAILED DESCRIPTION OF PREFERRED EMBODIMENT

Figure 1:
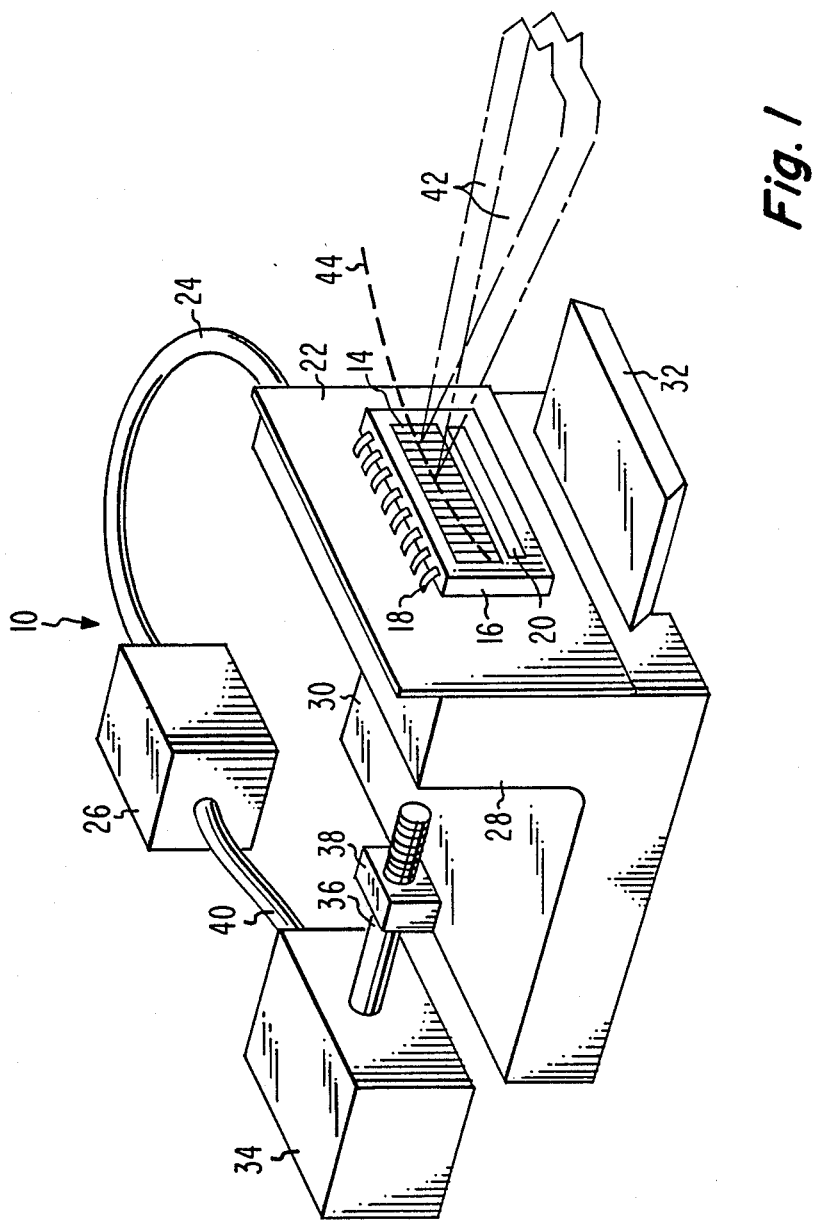
FIG. 1 is a perspective view of one form of a multi-element detector array according to the present invention.

In the use of a multi-element optical detector to measure and/or detect the features of an optical spectrum, it is necessary to focus the detector on the optical spectrum. One way to detect the effects of defocusing is to make a relative measurement of the high-frequency content of the spectral plot. If the spectrum is sufficiently smooth, the numerical quantity $(-F1+2\times F2-F3)$, where $F1$, $F2$, and $F3$ are measurements from three detector elements spaced linearly along the spectrum along a plane generally parallel to the focal plane, is a close approximation of the second derivative of the spectrum. The measurements may be of three consecutive elements or three elements which are spaced apart along the array. While the smoothness assumption is usually not valid for spectra, the variations in signals being desired and emphasized, I have found that the measure is still a good indicator of focus. This measure will hereinafter be referred to as the "second difference".

In the use of the second difference to determine proper focus of the detector with regard to the spectrum, the spacing between the detector and the spectrum along the optical line therebetween is varied and at different spacings the measurements F1, F2 and F3 are taken and the second difference determined. The point at which the second difference is the maximum value is the point of optimum focus. It is preferable that the second difference be determined at a minimum of three different points so that one point will have a value higher than the other two and with the two lower values being on opposite sides. However, if three measurements do not provide a maximum value, then additional measurements must be taken until a maximum value is obtained.

Although the second difference provides a suitable indication of the focus of the detector, the square of the second difference is more preferred. In addition, the problem of the random locations of peaks is solved by summing the square of the second difference over many detector elements. For this, the measurements at three different detector elements is taken and the second difference is determined and squared. Then the measurements of three more detector elements, at least one of which overlaps the first three elements, is taken and the second difference of these second three elements is determined and squared. In like manner the square of the second difference of additional sets of three elements along the array is determined. Finally, the values of all of the squared second differences are summed to give a final value which is compared with similar values determined at other positions of the detector array. Using this average over many detector elements also solves the problem of neighboring peaks interfering with the measurement peak, since the measurement is averaged over all the peaks in every case. This measurement also has a beneficial effect on the relative registration problem because the contributions of many spectral features are averaged. In earlier used method, measurements are rarely attempted when the spectrum is packed with many peaks all of similar heights because of the difficulty of assigning a baseline. The present method has been found to work reliably in this case. If the value of the sum of the squares becomes to large, the logarithm of the sum of the squares can be used. Although using the sum of the squares of the second differences is preferred, the sum of the absolute values of the second differences can be used.

A modification of the method of the present invention provides relative independence from spectral intensity. The sum of the square of the second differences is found to vary quadratically with the overall intensity of the spectrum. If this basic measure is divided by the sum of the squares of the intensities of the same detector signals, i.e. $(F1^2+F2^2+F3^2 \ldots +Fn^2)$, the ratio that results is an intensity independent measure of focus.

It is sometimes the case that the focal plane is not exactly planar, or is not exactly parallel to the plane of the array of elements of the detector. This means that there is a different optimal focus at different parts of the array. If the number of elements used to measure focus is limited to a subset of the elements, then focus can be optimized for the region of the subset. The focus measurement is more sensitive if a smaller number of elements is used. When a subset of the detector elements are used, it has been found advantageous to sum the squares of the individual second difference measurements, each multiplied by a weighting factor. The weighting factors are selected so that their magnitudes drop smoothly toward zero as the edge of the measurement region is approached. This modification minimizes difficulties caused by a large peak lying near the edge of the measurement region.

Referring to FIG. 1, one form of a detector apparatus which is capable of carrying out the method of the present invention in a spectrometer is generally designated at 10. The detector apparatus 10 includes a multi-element optical detector 12, which is shown to be a photodiode array. The photodiode array 12 is formed of a plurality of photodiode optical detecting elements 14 in side-by-side relationship with their detecting surfaces being in the same plane. The photodiode elements 14 are usually long and narrow, as the width is a limiting factor for the spectral resolution. The photodiode elements 14 are mounted on a support 16 and are connected to terminal pins 18 extending from the support 16. The detector 12 also includes various circuit elements 20 which are mounted on the support 16 and are connected between the photodiode elements 14 and the terminal pins 18. The circuit elements 20 serve to read-out the signal from each of the photodiode elements 14. The detector 12 is mounted on a printed circuit board 22 with the terminal pins 18 being connected to the circuit on the board 22. The circuit board 22 may also contain various electrical components which form the circuit related to the detector 12. A cable 24 connects the circuit board 22 to a controlling device 26, such as a microprocessor.

In order to provide relative movement between the detector 12 and the spectral image, the printed circuit board 22 is mounted on an upright arm 28 of a stage 30. The stage 30 is mounted on a slide 32 which allows the stage to be moved along the optical line between the spectral image and the detector elements 14. A motor 34 drives a threaded shaft 36 which is threaded through a nut 38 on the back end of the stage 30. The shaft 36 is parallel to the longitudinal axis of the slide 32 so that rotation of the shaft 36 by the motor 34 will move the stage 30 along the slide 32. The motor 34 is also connected to the controlling device 26 through a cable 40.

In the operation of the detector 10, such as for detecting light from an optical spectrometer, the light beams 42 from the spectrometer converge onto a focal plane 44. The purpose of the method of the present invention is to place the front surface of the photodiode elements 14 coincident with the focal plane 44 so that the elements 14 are in focus with the optical spectra which emits the light. For this purpose, the motor 34 is operated to move the stage 32 and place the optical detector 12 in a position close to what is predicted to be the focal plane. The readings from three of the detector elements 14 is taken to provide measurements F1, F2, and F3. From these measurements the second difference is determined. As previously stated it is preferable to determine the sum of the squares of the second differences divided by the sum of the squares.

The motor 34 is operated to move the optical detector 12 to different position along the axis of the path of the light from the optical spectrum and the second difference is determined at this new position. If this value is lower than the value at the initial position, the motor 34 is operated to move the optical detector 12 back to and beyond the initial position to a third position. The second difference is determined at this third position. If it is lower than the value at the initial position, then it is known that a maximum value is at a position somewhere between the second and third position. The motor 34 can then be operated to move the optical detector 12 to this position which provides the maximum value of the second difference, which should then be at the focal plane 44.

If the second difference value at either the second or third position was higher than the value at the initial position, the optical detector 12 is then moved to a position further from the initial position and the second difference determined. This is done until the value of the second difference reaches a maximum and then becomes lower. These determinations of the second differences at the various positions will provide a maximum value which indicates the position of the focal plane 44

Figure 2:
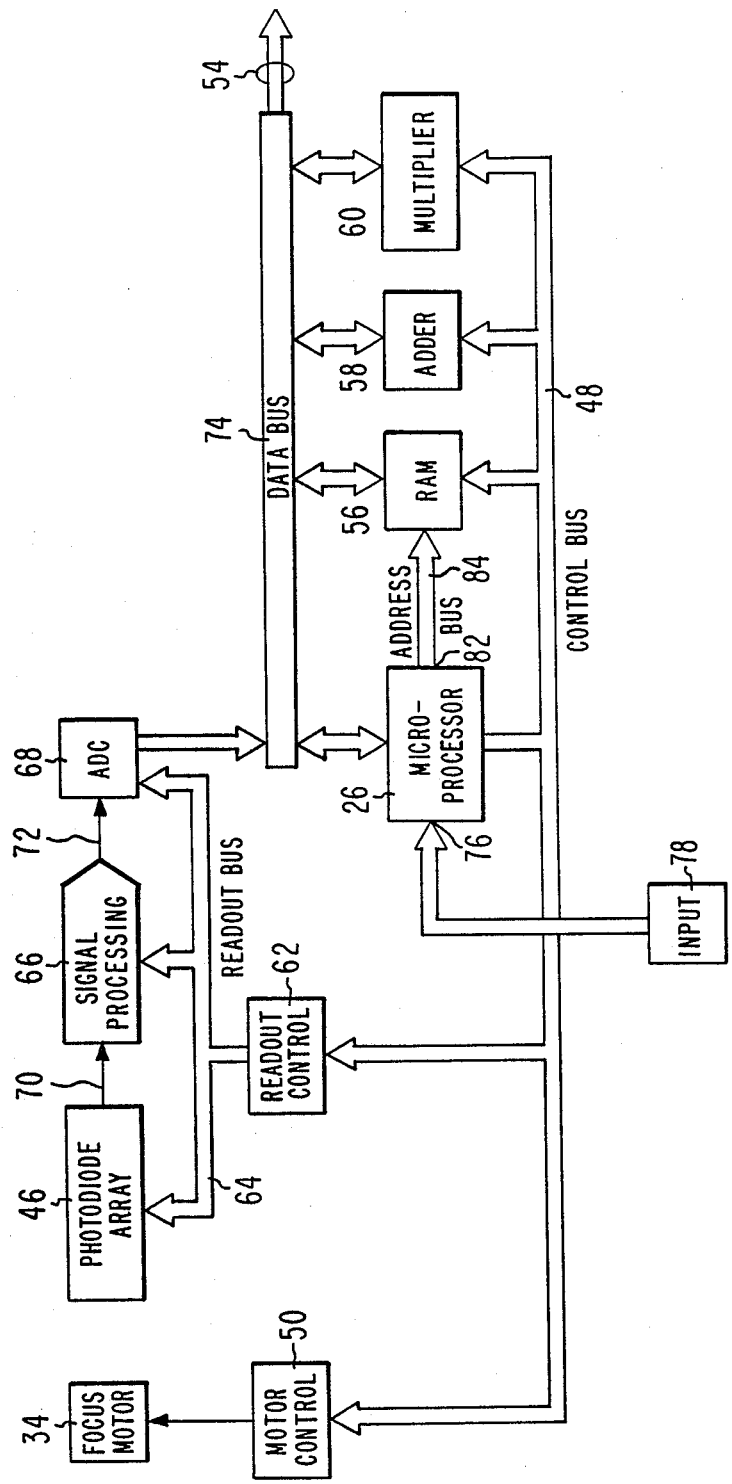
FIG. 2 is a diagram of one form of a circuit which can be used to carry out the method of the present invention.

Referring to FIG. 2, there is shown one form of a circuit, generally designated as 46, for measuring the degree of focus, and to control the same. The overall operation of the detector apparatus 10 is controlled by the operation of the microprocessor 26. Based on data collected by the photodiode array 12, the best position for focus is found, and caused to be set by means of instructions from the microprocessor 26 over the control bus 48 to the motor control circuit 50 which in turn drive the motor 34 through electrical connection 52. The microprocessor 26 has many functions besides measuring and controlling focus. For instance, it collects, averages and stores measurements from the photodiode detector 12 and, if desired, can communicate results based on these measurements to external devices, through an output port 54.

The microprocessor 26 is an integrated circuit or array of integrated circuits. It includes a control program on internal read only memory, and a source of clock signals which set the timing of the system. A suitable device for the microprocessor 26 is the Motorola 6501. The microprocessor 26 is connected to a random access memory (RAM) 56 which is a series of standard integrated circuits. For instance, HM-6116 devices can be used. The actual devices used depend on the type of data bus, serial or parallel, the size of data word used to store numbers, and the number of words of memory needed. The microprocessor 26 is also connected to an adder 58 and a multiplier 60. The adder 58 performs addition and subtraction and can be implemented by a series of devices of the LM74LS385 type which perform 4-bit additions and subtractions with parallel input and output. The multiplier 60 performs multiplication of pairs of numbers and can be based on SN74LS384 devices, which are 8 bit by 1 bit multipliers.

The microprocessor 26 is connected to a readout control 62 which, in turn, is connected through a bus 64 to the photodiode detector 12, a signal processing circuit 66 and an analog-digital converter (ADC) 68. A suitable device for the readout control 62 is a Programmable Logic Array configured to produce a time sequence of various control signals, with a desired order and duration. Signals from the readout control 62 are delivered to the photodiode detector 12, the signal processing circuit 66 and ADC 68 through the bus 64 to operate these devices jointly to effectively produce the desired output.

The photodiode detector 12 is electrically connected to the signal processing circuit 66 by a connection 70 so that the signals developed by the individual photodetector elements 14 are communicated to the signal processing circuit 66. The signal processing circuit 66 measures, detects and amplifies the signals from the photodetector elements 14. The signal processing circuit 66 is electrically connected to the ADC 68 by a connection 72. The output of the signal processing circuit 66, which is in analog form is delivered to the ADC 68 where it is converted to digital form. Each of the digital signals from the photodetector elements 14 produced by the ADC 68 is transmitted to the RAM 56 by a data bus 74, where the data can be stored.

The microprocessor 26 has a port 76 to which an input device 78 is connected. The input device 78 may be a keyboard for imputing information to the microprocessor or another computer working as a supervisor of the microprocessor 26. The microprocessor has an input/output port 80 which is connected to the data bus 74. In addition, the microprocessor 26 has a port 82 which is to an address bus 84 which carries signals from the microprocessor 26 to the RAM 56. It is the purpose of the signals on the address bus 84 to specify a certain location in the RAM 56 to be used when data is read into or out of the RAM 56.

As is well recognized by one skilled in the art, the above-described circuit should include many auxiliary devices, not shown. These would include power connections, ground planes and shielding, bypass capacitors and other passive devices. Also required are certain active devices, such as data latches which control transmission to and from the data bus 74 and which communicate with the control bus 48. Other active devices may be needed, depending on the exact application, when several integrated circuits of one type, such as a multiplier circuit, are combined to function on a larger word length.

One function of the circuit 46 is to measure the degree of focus according to the method of the present invention. For a preferred method of operation of the circuit 46 to achieve this result, let the sequence of digital values from one cycle of readings of the photodiode element 14 which ar stored in the RAM 56 be called the array S, with values S(i) of the index i varying from 1 up to some number n. The microprocessor 26 by means of signals on the control bus 48 directs the transfer of two successive readings, S(i) and S(i+1) to the adder 58. The adder 58 produces a digital signal equal to the difference between the two signals. This new signal, D(i) is a member of an array D, and is equal to the first difference of the signals in the array S(i). The microprocessor 26 then causes the transfer of the signal D(i) into the RAM 56 where the value is stored at a certain location. This sequence of operations is repeated for each value of i from 1 up to n−1.

The operations described above are repeated, except that elements of the array D are used as inputs rather than the elements of the array S. The new output is an element, D2(i) of the second difference array D2, where i varies from 1 up to n−2. The elements of D2 are stored in the RAM 56.

Next the microprocessor 26 causes one element of the second difference array D2(i) to be transmitted twice to the multiplier circuit 60. The multiplier circuit 60 is directed to produce an output SQR(i), which equals the square of D2(i). The result SQR(i) is stored at certain locations in the RAM 56. This process is repeated for each value of the second difference array resulting in the elements SQR(i) of the array SQR for i equal to 1 up to n−2.

Next, two values SQR(i) and SQR(i+1) of the squared array are caused to be transmitted to the adder 58 which is directed to produce the sum of these two numbers. The result is not transmitted to the RAM 56 but is retained in the adder 58. The next value SQR(i+2) is transmitted to the adder 58 and added to the earlier result. This process continues until all the values of SQR have been added together. Now, the result is transmitted back to the RAM 56 and stored there as Result. Result is a number representing the sum of the squares of the second differences. It is a number that reaches a maximum when the focus is optimally set.

The above process is repeated with the photodetector 12 being set a different positions along the axis of the light from the optical spectrum being measured. At each position the Result is transmitted to the RAM 56 where, along with information indicating the position, it is stored. The Results can be compared and when a Result of maximum value is obtained, the focusing means can be directed to move to the position which gave the maximum value.

Thus, there is provided by the present invention apparatus and method for easily and quickly focusing a photodetector at the focal point of an optical spectrum. Also, with the apparatus and method of the present invention the focusing can be achieved automatically. Although the apparatus of the present invention has been described with the photodetector device being an array of photodiodes, other detector elements, such as video cameras, can be used. Also other means than a stage on a slide can be used to move the photodetector with respect to the focal plane. In fact, the photodetector can be maintained stationary and the focal plane moved with suitable optical elements in the light path. Also, the line of travel of the focusing means need not be along the axis between the spectrometer and the detector. In such a case, the adjustments to focus also entail shifts in the detected signals along the row of detecting elements. In addition, other circuits can be used to determine the second difference and control the focusing apparatus including a computer which is programmed to carry out the necessary calculations and controls.

I claim:

1. A method of focusing a multi-element optical photodetector array at the focal plane of an optical spectrometer comprising the steps of:
  (a) placing the optical detector with the plane of the array of elements being substantially parallel to the focal plane;
  (b) taking optical measurements of at least three of the elements of the array;
  (c) determining the second difference of said measurements by the equation $(-F1+2\times F2-F3)$, where F1, F2, and F3 are the three measurements;
  (d) provide relative movement between the optical detector and the focal plane along the axis of the light path from the optical spectrometer to the focal plane to change the position of the optical detector with respect to the focal plane;
  (e) repeat steps (b) and (c); and
  (f) place the detector at the position which provides the maximum value of the second difference.

2. A method in accordance with claim 1 in which step (c) includes determining the square of the second difference of different sets of detector elements along the array.

3. A method in accordance with claim 2 in which step (c) includes determining the sum of all the squares of the second differences.

4. A method in accordance with claim 3 in which step (c) includes dividing the sum of all the square by the sum of the squares of all of the measurements used to determine the second differences.

5. A method in accordance with claim 4 in which the elements of each of the sets of measurements overlap each other along the array of detector elements.

6. A method in accordance with claim 1 in which steps (b) and (c) ar carried out at least three times to determine the maximum value of the second differences.

7. A method in accordance with claim 6 in which if after changing the position of the detector array with respect to the focal plane from the initial position of the detector array, the value of the second difference at the second position is less than the value of the second difference at the initial position of the detector array, the relative movement of the detector array with respect to the focal plane is carried out in the direction opposite t the first movement to a position past the initial position and the second difference is determined at the third position.

8. A method in accordance with claim 7 wherein if the value of the second difference at either the second or third position is greater than that at the initial position, the detector array is moved to positions further from the initial position and the second difference is determined at each position until a second difference lower than that at the initial position is obtained.

9. A method in accordance with claim 1 wherein the detecting elements used to measure and adjust focus are limited to a subset of the elements available in the spectrometer.

10. A method in accordance with claim 9 wherein the second differences calculated from the signals from the elements of the subset used ar modified by weighting factors, wherein said weighting factors are lower for elements near the periphery of the subset.

11. Apparatus for focusing a multi-element optical detector with respect to the focal plane of an optical spectra in which the elements of the detector are arranged in a planar array comprising:
  means for supporting the detector array with the plane surface of the elements facing the optical spectra and being substantially perpendicular to the axis of the light path between the optical spectra and the focal plane;
  means for providing relative movement between the array and the focal plane along said axis so as to place said array at different positions along said axis with respect to the focal plane;
  means for determining the output of the elements of the array at each position of the array;
  means for determining from said element outputs the second difference of said outputs by the equation $(-F1+2\times F2-F3)$, where F1, F2, and F3 are the outputs of three of the elements of the array; and
  means for determining the position of the array which provides the maximum value of the second difference.

12. The apparatus in accordance with claim 11 in which the means for determining the second difference at each position of the array determines the square of the second difference.

13. The apparatus in accordance with claim 12 in which the means for determining the second difference at each position of the array determines the square of the second difference of the output of a plurality of sets of three of the elements along the array and sums the squares of each of the second differences.

14. The apparatus in accordance with claim 13 in which the mean for determining the second difference at each position of the array determines the sum of the squares of the second differences of the output of a plurality of sets of the elements and divides the sum of the squares of the second differences by the sum of the squares of the outputs of all the elements used to determine the sum of the squares of the second differences.

* * * * *